US008787202B2

(12) United States Patent
Kuriyan

(10) Patent No.: US 8,787,202 B2
(45) Date of Patent: Jul. 22, 2014

(54) METHOD AND SYSTEM USING WIRELESS PACKET DATA NETWORKS ARCHITECTURE FOR REMOTE PROCESS CONTROL AND PROCESS MONITORING APPLICATIONS

(76) Inventor: George W. Kuriyan, Bridgewater, NJ (US)

(*) Notice: Subject to any disclaimer, the term of this patent is extended or adjusted under 35 U.S.C. 154(b) by 471 days.

(21) Appl. No.: 12/820,276

(22) Filed: Jun. 22, 2010

(65) Prior Publication Data
US 2011/0310743 A1   Dec. 22, 2011

(51) Int. Cl.
| H04L 12/28 | (2006.01) |
| H04W 4/00 | (2009.01) |
| G08C 17/00 | (2006.01) |
| H04W 76/02 | (2009.01) |

(52) U.S. Cl.
CPC ............. *G08C 17/00* (2013.01); *H04W 4/00* (2013.01); *H04W 4/001* (2013.01); *H04W 76/02* (2013.01)
USPC .......................................... 370/254; 370/333

(58) Field of Classification Search
None
See application file for complete search history.

(56) References Cited

U.S. PATENT DOCUMENTS

| 7,472,188 B2* | 12/2008 | Nakamura et al. ............ 370/232 |
| 7,630,861 B2* | 12/2009 | Longsdorf et al. ............ 370/410 |
| 8,134,941 B2* | 3/2012 | Gade et al. ..................... 370/311 |
| 2003/0145119 A1* | 7/2003 | Bender et al. .................. 709/249 |
| 2004/0224712 A1* | 11/2004 | Tiedemann et al. .......... 455/518 |
| 2006/0034360 A1* | 2/2006 | Tzannes ......................... 375/222 |
| 2006/0229091 A1* | 10/2006 | Rezaiifar et al. .............. 455/509 |
| 2006/0268738 A1* | 11/2006 | Goerke et al. ................. 370/254 |
| 2007/0201406 A1* | 8/2007 | Yoon et al. .................... 370/335 |
| 2008/0159248 A1* | 7/2008 | Li .................................. 370/342 |
| 2008/0301477 A1* | 12/2008 | Gade et al. .................... 713/320 |
| 2008/0304442 A1* | 12/2008 | Kaneko et al. ................ 370/328 |

* cited by examiner

*Primary Examiner* — Gregory Sefcheck
*Assistant Examiner* — Joshua Smith
(74) *Attorney, Agent, or Firm* — Porzio, Bromberg & Newman, P.C.

(57) ABSTRACT

A system for error avoidance and automatic recovery is combined with the accurate and reliable transmission system. The present invention provides a multi-variable control system using remote control with a wireless communication system. A plurality of closed loop control systems are connected through the wireless communication system. A master controller monitors the closing of each of the loops in the system and stores information for the status of the control loops in a control table at a control center. When a state variable is transmitted to the control center, a master controller notes that the initial value of the closed loop control system has been set. When the control center sends a control action to equipment or a process this closes the loop, the master controller notes that the closed loop control system has been closed for a particular time. If the closed loop control system does not get a loop closed, the control center immediately detects it. Thereafter, an alternative control action can be performed by the system.

31 Claims, 15 Drawing Sheets

METHOD AND SYSTEM USING WIRELESS PACKET DATA NETWORKS ARCHITECTURE FOR REMOTE PROCESS CONTROL AND PROCESS MONITORING APPLICATIONS

BACKGROUND OF THE INVENTION

1. Field of the Invention

The present invention relates to a method and system for remote process control and monitoring of applications in a wireless network architecture.

2. Description of Related Art

In process control applications, conventional wired RS232 connections over short distances is a preferred method for communication and control because of the very high reliability, accuracy and ease of such connections. Wired communications, such as RS232, are highly reliable and in addition RS232 connections guarantee the deliver of the data that is sent.

Commercial Wireless Packet Data Networks serve multiple applications, such as email, file transfer, and the like and are designed to perform well over a wide geographical area. Most of these applications can tolerate some minor inaccuracies once in a while. The applications are also tolerant of delays in the receipt of data. However, process control and process monitoring applications cannot tolerate inaccuracies and the delay in data receipt has to meet stringent requirements as well. For these reasons, Wireless Packet Data Networks have not been widely accepted in these applications.

U.S. Pat. No. 6,678,255 describes techniques for transmitting process control using a wireless data interface system for fixed point-to-point communication over geographically separated areas, this patent is hereby incorporated by reference in its entirety into this application. Data is collected by a remote monitoring device and transmitted to a first Cellular Digital Packet ("CDPD") modem via a RS232 interface. The CPDP modem transmits a signal to a second CDPD modem for initiating communications. The second CDPD modem returns a signal indicating the status of the interface. Data transmission is initiated when the status of both serial data interfaces is established. The data to be transmitted is concatenated to a signaling packet on the initiating side and the packet is transmitted. All messages that are received are assumed to be received without error. There is no methodology for determining if the message has residual errors. The results from this technique is not quantifiable regarding accuracy and reliability.

It is desirable to provide a method and system to enable transmission of data over Wireless Packet Data Networks in geographically separated areas with quantifiable reliability and accuracy as comparable to wired communications in general and superior to wired communications in specific circumstances in which information messages can be transmitted by a high accuracy protocol and signaling messages can be separately transmitted by a fault tolerant protocol.

SUMMARY OF THE INVENTION

The present invention is a system and method primarily for providing remote accurate and reliable transmissions for the connectivity needs of large scale complex process control systems. The system can be used for process control where complete automatic control and process monitoring is needed from a far away location that is miles away. The system can be implemented at the end user modem level and carrier infrastructure to increase the accuracy of data transmission and the associated reliability of the applications. The invention is based on operational cellular common systems.

This invention is particularly useful for the remote control of off-shore oil drilling operations where remote control of the oil drilling platform from on-shore control is desirable.

A complex process control system is typically described mathematically in matrix differential equation such as $$\frac{dY}{dt} = A \cdot X(t) + B \cdot Y(t) + C(t).$$

In such a system, 100% reliability in the connectivity is required. Reconfiguration of the system in an expeditious manner is also needed. This invention deals with the connectivity needs of such a system for remote control and additionally brings operational and an arrangement of benefits for real time remote monitoring of the process from widely dispersed locations using e-mail/web capabilities.

In order to meet the connectivity needs of large complex process control systems, the invention achieves the following: provide end-to-end connectivity that is 100% reliable or less than one error in one million transactions; provides automated reconfiguration capability from computerized inputs with possible interface to manual computer generated or graphics; provides immediate failure notifications from occurring within the network or in equipment failure; provides end-to-end synchronized time series management; provides real-time monitoring capability for supervisory and administrative management needs geographically diversified mobile phones, such as BlackBerry, PDA, personal digital assistant.

The present invention provides a communication scheme over a cellular wireless whereby RS232 type connector band communications is conducted using discrete and different pins in the connector for signaling and information. The sending and receiving applications communicate using the signaling pins and determine that the information can be transmitted and received accurately. The invention enables the chips driving the RS232 type connections for fixed wired connection to be used in a cellular wireless mode without any modifications.

The invention sends signaling information and data simultaneously over different modems to achieve faster message completion. By using fault tolerance in the signaling information, and by monitoring the level of errors in the signaling information, diagnosis of the cellular environment for transfer performance is done at every message transfer. The present invention allows a single message that can be transmitted over multiple wireless modems to reduce the transmissions time and to provide fault tolerance of hardware.

Cellular systems comprise of land line infrastructure and radio infrastructure. The landline infrastructure is designed for very high reliability. The radio infrastructure is designed for large volumes of transactions from an area of the cellsite coverage. Since each transaction generates interference in the radio spectrum, with a number of mobile users generating interference, it is difficult to maintain high reliability for a fixed location for a specific user. The present invention provides high reliability for multiple connections at a fixed location.

The present invention provides that the delay of the message can be kept small and in a narrowly specified range. The present invention provides a guaranteed maximum and average time lag caused by the data transmission for the processes being controlled. Over a well maintained network that is controlled to provide strict performance requirements, the present invention can increase the accuracy of the data transmission to near 100% and the reliability of the application also to near 100% for long periods. The present invention can provide less than about one error in 1 million to 5 million messages. In high scan rate data applications, this represents error free performance for more than 1 year. In the present invention, data transmission messages can be transmitted by the high accuracy protocol described above and signaling messages can be transmitted separately by a fault tolerant protocol.

In an embodiment of a wireless carrier infrastructure that handles 50 or 100 user devices from the same location, the present invention provides an error rate of less than 1 error in 100 million transactions. The present invention provides the maximum time lag of less than about 3 seconds with an average time lag of about 1.25 to 2 seconds, including control algorithm calculations.

When remote control is considered for off-shore operations, it is not usually sufficient for the remote control of one or two feed back control systems. Large scale deployments of communication from the off-shore site to on-shore control center is addressed by the present invention. With large scale deployments, the cost of failure increases significantly. It is desirable that fault tolerance is incorporated in (i) communication error control and (ii) in the possible failures of devices. The present invention provides large scale fault tolerant multiplexed remote control implementations.

In one embodiment, the present invention provides a multi-variable control system using remote control with a wireless communication system. A plurality of closed loop control systems are connected through the wireless communication system. A master controller monitors the closing of each of the loops in the system and stores information for the status of the control loops in a control table at a control center. When a state variable is transmitted to the control center, a master controller notes that the initial value of the closed loop control system has been set. When the control center sends a control action to equipment or a process this closes the loop, the master controller notes that the closed loop control system has been closed for a particular time. Even though the wireless system of the present invention is fault tolerant and highly reliable, the devices or processes that may get connected to the system may not have such capabilities. Accordingly, if the closed loop control system does not get a loop closed, the control center immediately detects it. Thereafter, an alternative control action can be performed by the system.

The present invention increases reliability with fault tolerance techniques by including one or more of the following features: cellular site engineering guaranteeing at least three channels for data with specified bit error rates at a particular site from multiple cell sites; segmented overlay protocol for reducing possible errors; cellular service performing monitoring and channel switching during performance degradation; and fault tolerant modem bank. The present invention also provides one or more of the following operational features: early detection of errors and time series integrity for each transaction and dependent transactions; Internet capabilities such as email for real time control and operation; and reconfiguring of network connections using automated commands.

The present invention provides supporting large number of remote control locations as an enhanced service provider dealing with the issues of network, devices and operation. The present invention provides delivery of data in a timely and reliable manner, with the use of wireless packet data network. The present invention provides the following advantages: increased reliability in comparison to dedicated communication lines; Internet based Architecture; technology evolution and software and hardware upgrades; e-mail of real time data for management and supervisory needs; and a larger area where high reliability and high accuracy can be provided for applications.

The invention will be more fully described by reference to the following drawings.

DETAILED DESCRIPTION

Figure 1:
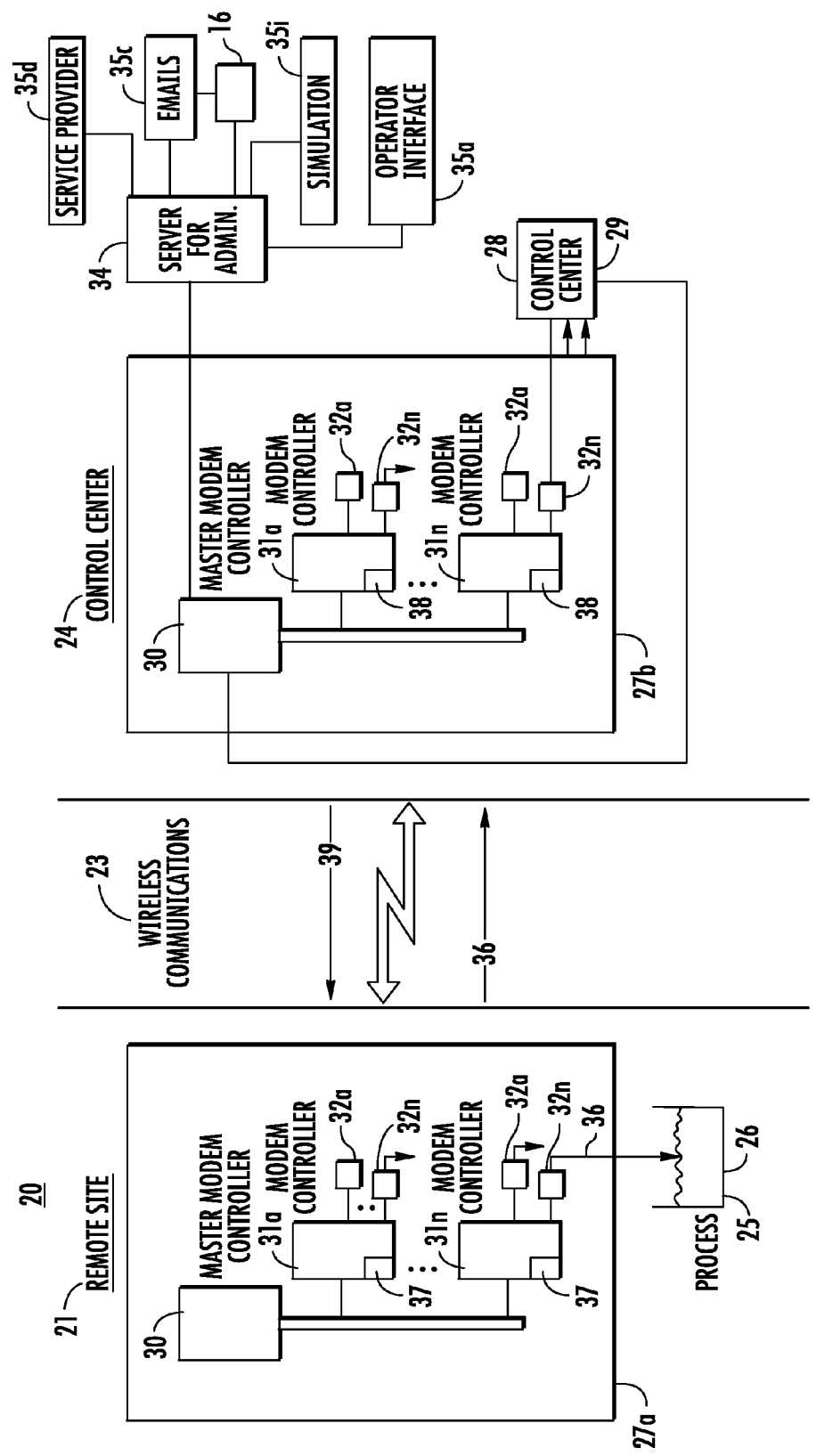
FIG. 1 is a schematic diagram of an accurate and reliable transmission system in accordance with the teachings of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

FIG. 1 illustrates a schematic diagram of an accurate and reliable transmission system 20 in accordance with the teachings of the present invention. System 20 can be used as network architecture for remote process control and process monitoring applications. Signaling messages and data transmission messages can be communicated using system 20. Remote site 21 communicates using wireless communications 23 to control center 24. For example, wireless communications 23 can be a wireless packet data network, Internet connection or other wireless based connection. Remote application process 25 is executed on computing device 26 at remote site 21. Remote application process 25 uses modem bank 27a to communicate with wireless communications 23. A hardwired connection can be used for connecting computing device 26 to respective modem 32a-32n of sending modem bank 27a via a hardwired RS232 interface. Control center process 28 uses modem bank 27b to communicate with wireless communications 23. Control center processes 28 are executed on computing device 29. Modem banks 27a-27b include master modem controller 30 which controls a plurality of modem controllers 31a-31n. Modem controllers 31a-31n control respective modem 32a-32n.

Remote site 21 includes administration server 34. Administration server 34 includes administration processes such as, for example, operation interface 35a, simulation interface 35b, email interface 35c and service provider interface 35d.

Remote application process 25 and control center process 28 can use application level protocols to communicate. Remote application process 25 can communicate to respective modem 32a-32n and control center process 28 can communicate to respective modem 32a-32n with application to modem protocols. In an embodiment using a hardwired connection using RS232C protocol, the application layer signals are connected to separate pins in a RS232C connector. Modem 32a-32n can communicate with modem-to-modem protocols.

During operation of the high accuracy protocol, remote application process 25 at remote site 21, using wireless communications 23, sends data 36 to respective modem 32a-32n at control center 24. Respective modem 32a-32n at remote site 21 stores data 36 in buffer 37. Respective modem 32a-32n transmits data 36 to respective modem 32a-32d at control center 24. Respective modem 32a-32d at control center 24 stores data 36 in buffer 38 and sends data 39 it received back to respective modem 32a-32d at remote site 21. Respective modem 32a-32d at remote site 21 compares data 39 received from modem 32a-32d at control center 24 to data 36 stored in sending buffer 37. If data 39 has no errors, respective modem 32a-32n at remote site 21 alerts remote application process 25 to transmit a ready-to-transmit signal to control center process 28. Upon receiving the ready-to-transmit signal, control center process 28 alerts respective modems 32a-32d at control center 24 to send data 36 stored in received buffer 38 to control center process 28. On receiving data 36, control center process 28 sends a data received signal to remote application process 25. At that time, application level signals are turned off by both remote application process 25 and control center process 28. If data 39 received at modem 32a-32d of remote site 21 is determined to have errors, remote application process 25 retransmits the entire message of data 36 again using respective modem 32a-32n at remote site 21 to respective modem 32a-32n at control center 24 and a similar verification is performed, as described above.

Figure 2:
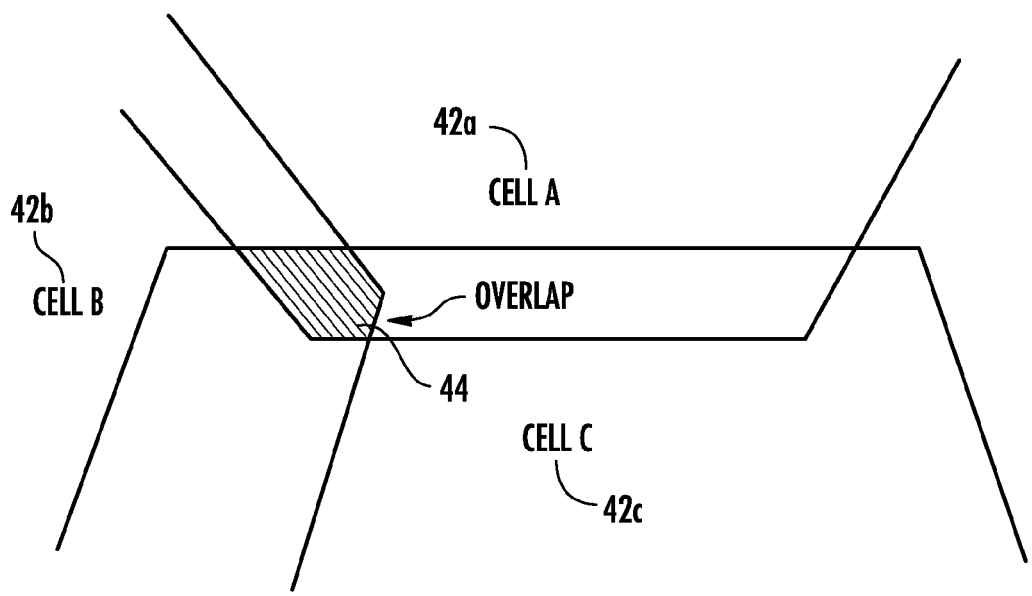
FIG. 2 is a schematic diagram of a wireless service comprising a plurality of cells.

Service provider 35d provides service for wireless communications 23. In one embodiment, service provider 35d provides wireless service comprising a plurality of cells 42a-42c, as shown in FIG. 2. It will be appreciated that any number of cells can be provided by the service provider. Cells 42a-42c overlap in region 44. Accordingly, in region 44, any of cells 42a-42c can provide service. Modems 32a-32n can operate over channels corresponding to cells 42a-42c. It is preferred that at least three channels for data with specified bit error rates at a particular site from multiple cell sites are used in system 20.

If modem 32a-32n of modem bank 27a or 27b encounters difficulty in transmitting data or completing a transaction over one of channels 46a-46c, it will try to complete the transmission by switching to an alternate one of channels 46a-46c. If that fails, it then alerts the master modem controller 30 which will attempt to complete the transaction using a separate modem under its control.

Figure 3:
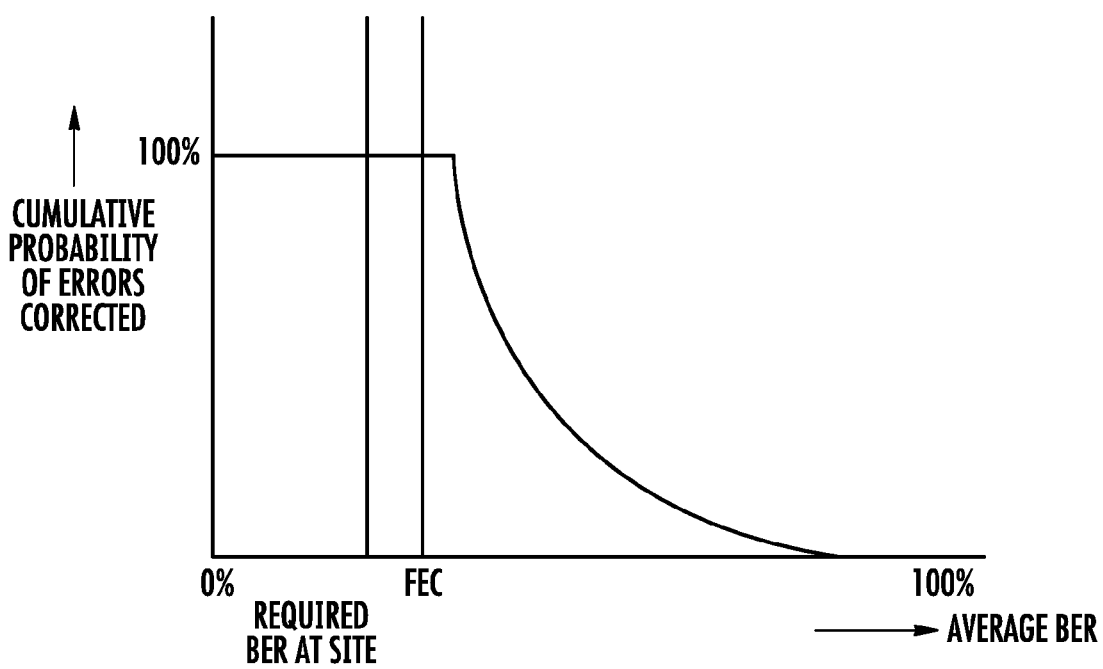
FIG. 3 illustrates a graph of the cumulative probability that message received is error free versus the average bit error rate at a remote site.

FIG. 3 illustrates a graph of the cumulative probability that message received is error free versus the average bit error rate at remote site 21. A threshold bit error rate (BER) can be set. Modem controllers 31a-31n monitors all retransmissions from remote application process 25. For example, modem controllers 31a-31n determine if more than a predetermined threshold number of retransmissions, for example, two retransmissions, have occurred in a predetermined threshold period, for example, five (5) minutes. If the number of retransmissions has exceeded the predetermined threshold, the BER at that location is likely to have increased or the variance of the BER has increased.

When an increase in BER as described above is determined, a corrective module can block traffic increase in adjacent channels. The data traffic is moved to a second most desirable alternative. Since each message transmission requires multiple transmissions, the changeover preferably happens immediately on detecting this condition on a channel. The cell site and the modem keep track of two alternative channels at all times. The alternative is from another cell site. After the BER has been corrected, the channel is put back as a valid alternative.

In order to utilize the multiplexing potential, modems 32a-32n are grouped into modem pools using modem controllers 31a-31n. Since the modems are full duplex, there will be separate queues for sending and receiving. Two methods are available for increasing the efficiency: staggering the start time for data scan; and first in first out (FIFO) or last in first out (LIFO) servicing.

The amount of time used for communication for one particular data point is typically about 180 milliseconds. The return communications takes place after the computation of the response and that also equals about 180 milliseconds. Therefore, in a data scan period of about 15 seconds or more, the communication usage on the modem is only about 360 milliseconds. Since the data scan is conducted on a fixed period, if the start of the data scan is set away from the start of the data scan for other data points, these communications can be conducted without any time conflicts. The constraint for this type of modem usage is that when the operator sets up the control system loop, it is desirable that the control system starts operating right away, not after a delay. If there is flexibility to accommodate a small delay of about 1 second, the capacity to handle multiple points increases substantially. In this approach, incoming communication request from a data point can be queued up as FIFO or LIFO. If the modem is in use, the request is held back until the on-going communication is finished. For example, a delay of about 30 milliseconds could be used for each request in the queue.

Figure 4A:
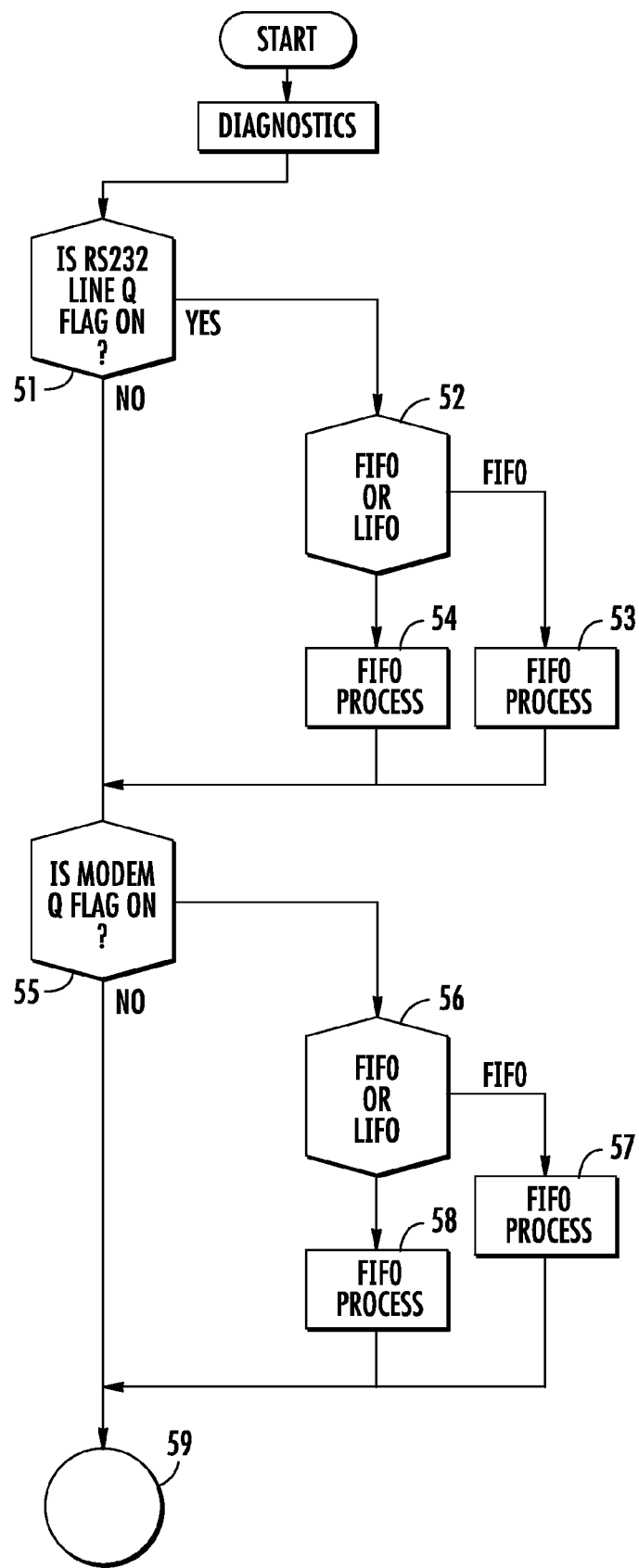
FIG. 4 is a schematic flow diagram of a flow chart for processing steps for modem controllers.
Figure 4B:
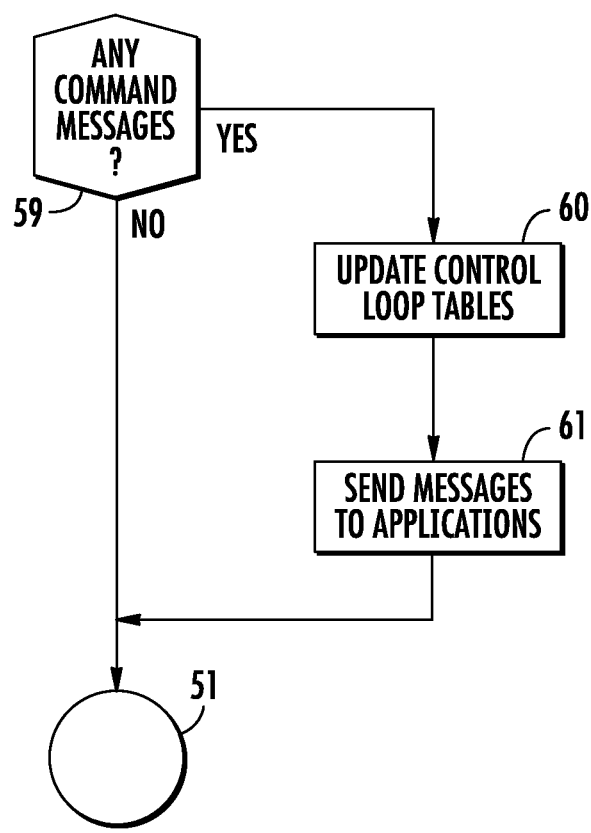
Figure 5A:
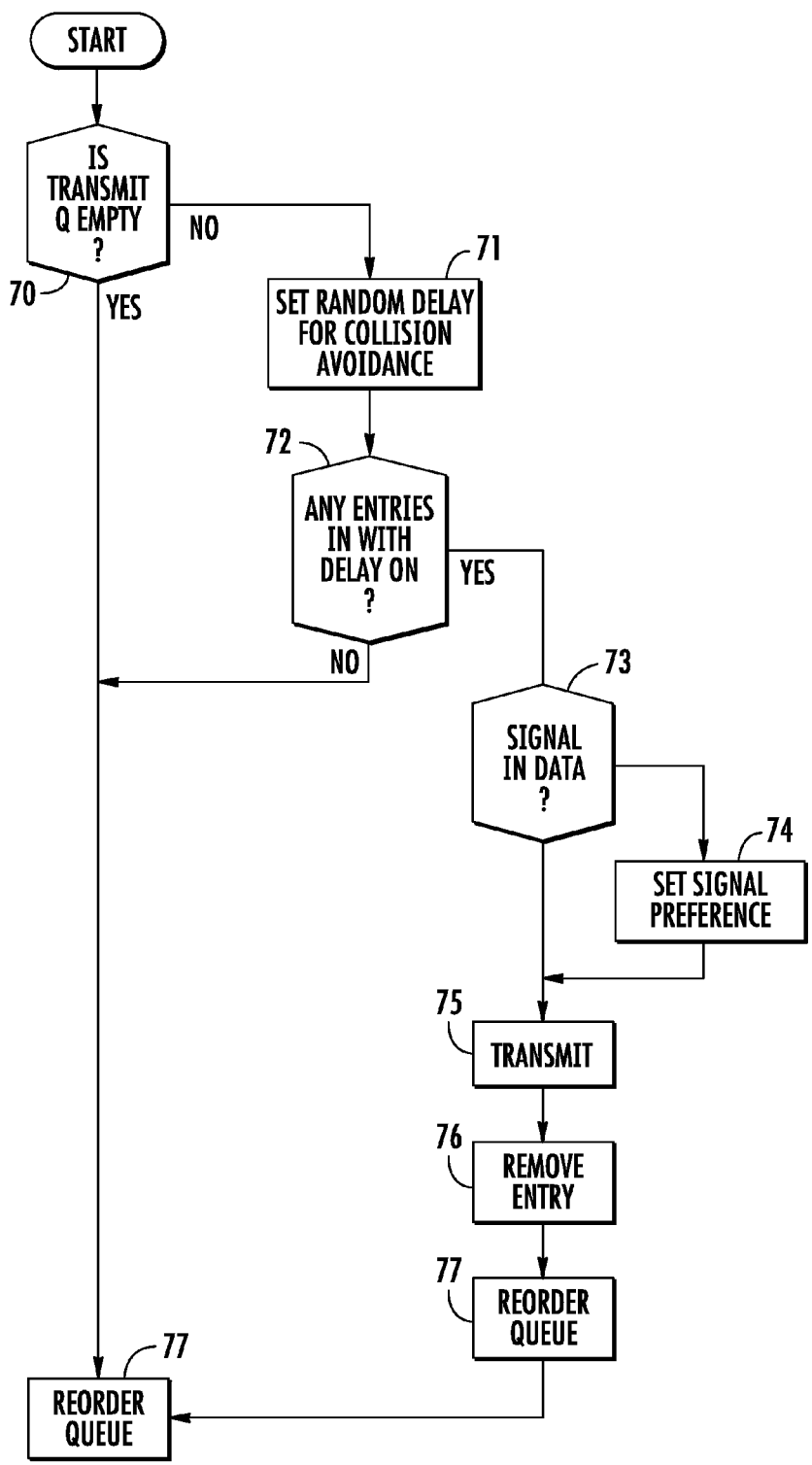
FIG. 5 is a flow diagram of processing steps for modems.
Figure 5B:
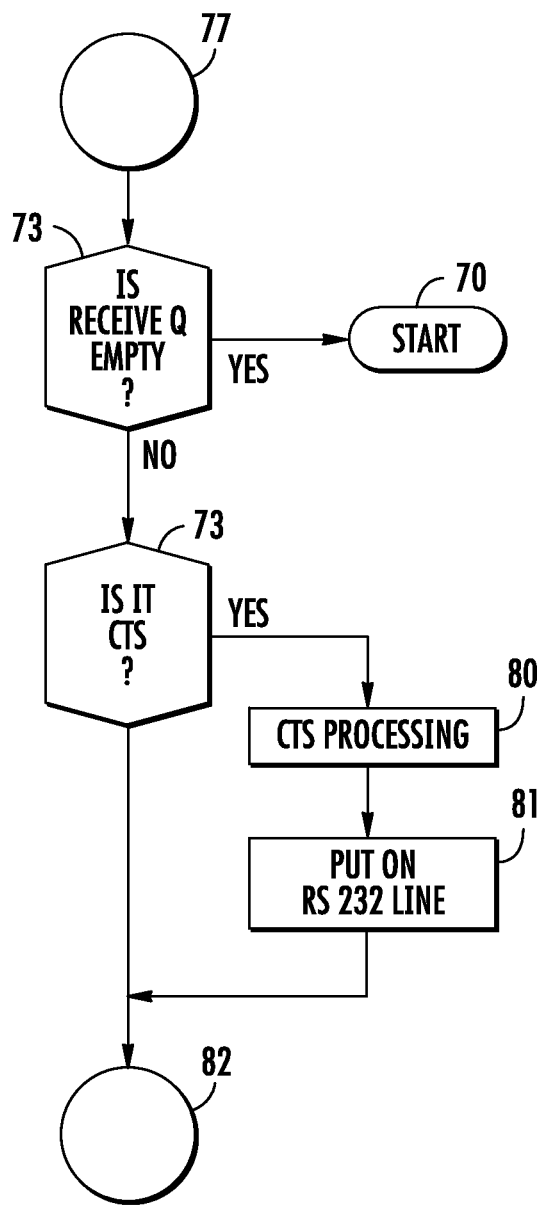
Figure 5C:
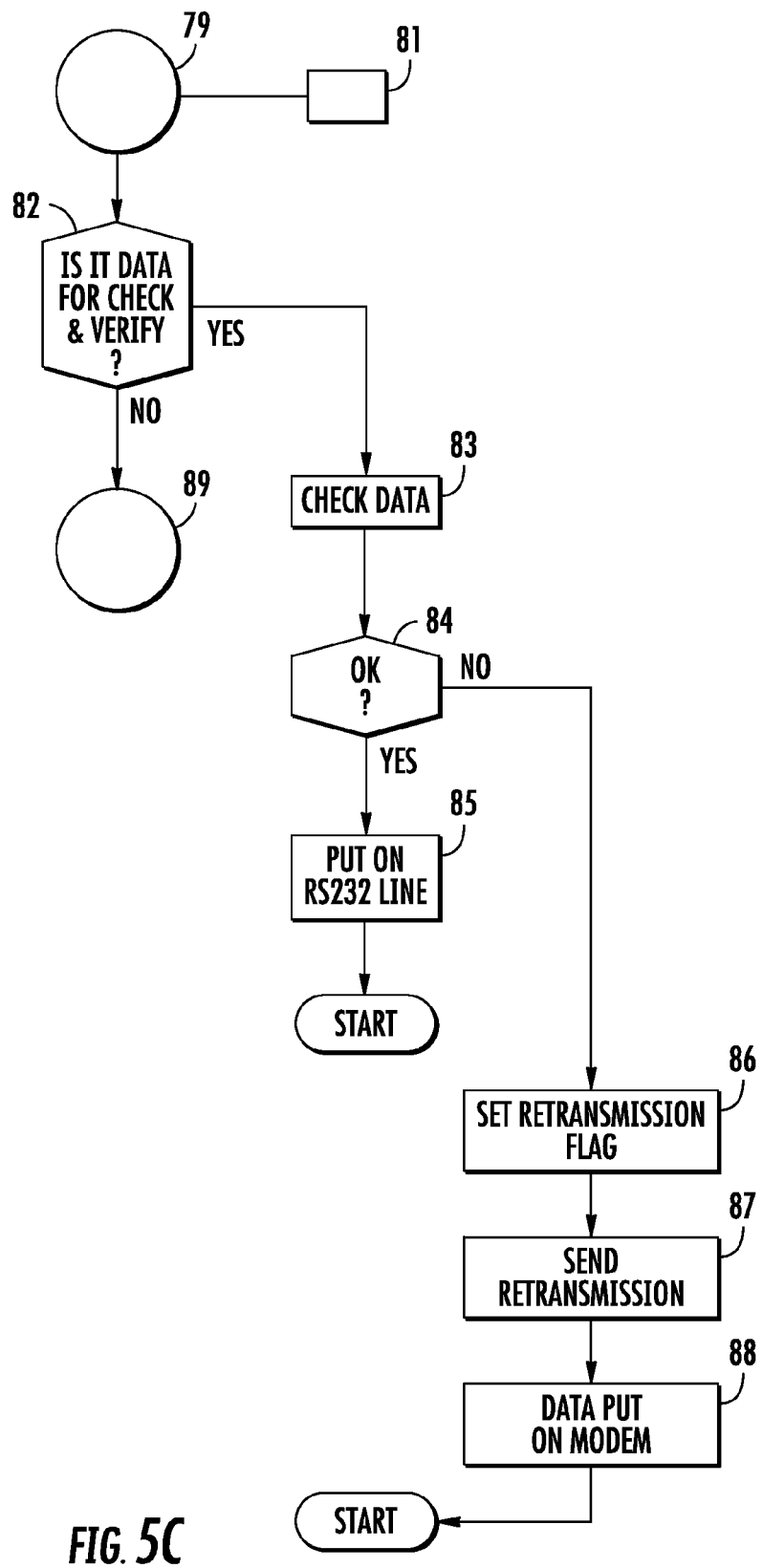
Figure 5D:
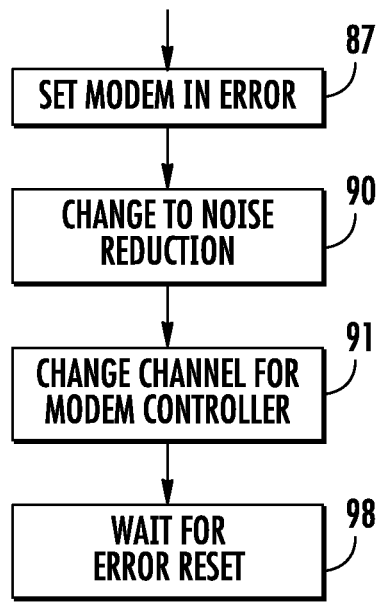

FIG. 4 is a flow chart for modem controllers 31a-31n. Diagnostics at modem controller 31a-31n determine in block 51 if the RS232 line Q flag is on. If it is determined that the RS232 Q flag is on, a decision is made in block 52 to perform FIFO process of block 53 or LIFO process of block 54. If it is determined that the RS232 Q flag is not on, or the FIFO process of block 53 and the LIFO process of block 54 have been performed, a decision is made in block 55 if the modem Q flag is on. If it is determined that the modem Q flag is on, a decision is made in block 56 to perform FIFO process of block 57 or LIFO process of block 58. In block 59, it is determined if any command messages were received at modem controller 31a-31n. If it is determined that command messages were received, control loop tables are updated in block 60 and messages are sent to applications in block 61. If no command messages were received in block 59 or after execution of block 61, the flow chart returns to block 51. Examples of command messages include reconfiguration messages, diagnostics on demand and setting modems/lines on line and offline.

FIG. 5 is a flow diagram of processing for modems 32a-32n. In block 70, it is determined if the transmit queue is empty. If the transmit queue is empty, a random delay is set for collision avoidance in block 71. In block 72 it is determined if there are any entries in the queue with delay timed out. If there are entries in the queue with delay timed out, a signal is sent in block 73 and signal protocol is set in block 74.

In block 75, the entry in the queue is transmitted. In block 76, the entry in the queue is removed and in block 77 the remaining entries in the queue are reordered. In block 78, it is determined if the receive queue is empty. If the receive queue is not empty it is determined if the data is Clear To Send ("CTS") in block 79. If it is determined in block 78 that the data is CTS, block 80 is performed for CTS processing. Following CTS processing, CTS data is put on RS 232 line in block 81. In block 82, if the data is not CTS, it is determined if the data is for check and verify. If the data is for check and verify, the data is checked in block 83. The data is determined for correctness in block 84. If the data is correct, it is put on RS 232 line in block 85. If the data is not correct, a retransmission flag is set in block 86 and is sent in block 87. In bock 88, the data is put on Modem Q.

If it is determined in block 82 that the data is not for check and verify, the modem is set in error in block 89. In block 90, an administration message is sent to the service provider for noise reduction. In block 91, the channel of the modem controller is changed. In block 92, a wait for an error reset if performed.

Figure 6A:
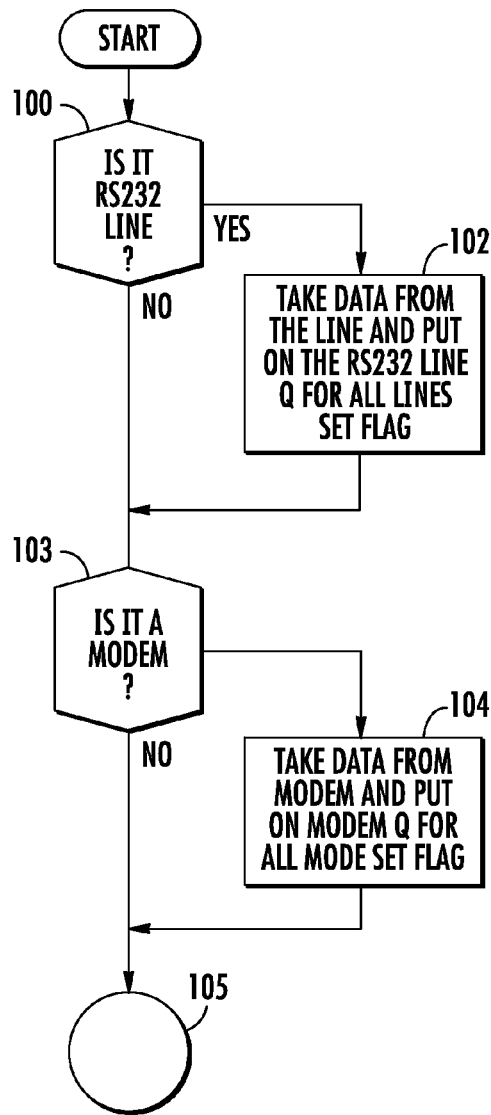
FIGS. 6A and 6B is a flow diagram of a modem controller interrupt process.
Figure 6B:
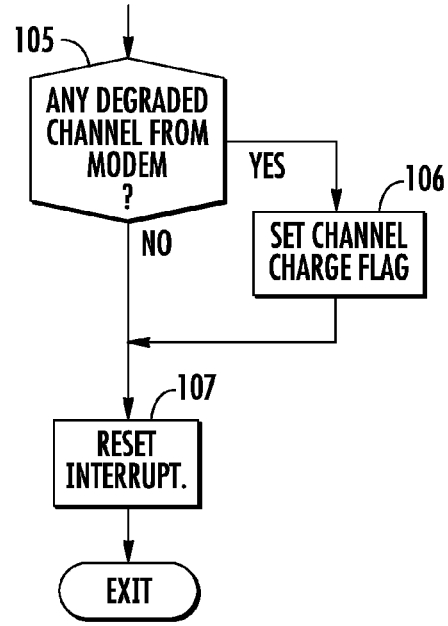

FIGS. 6A-6B is a flow diagram of a modem controller interrupt process. In block 100, it is determined if it is a RS232 line. If it is a RS232 line, the data it is taken from the line and put on the RS232 Q line for all lines and a flag is set in block 102. If it is not an RS232 line, it is determined if it is a modem in block 103. If it is a modem, the data is taken from the modem and put on modem Q for all modems and a flag is set in block 104. In block 105, it is determined if there is any degraded channel from the modems. If there is a degraded channel, the channel is retrieved and a flag is changed in block 106. If there has not been any degraded channel or if block 106 has been performed, an interrupt is established in block 107.

Figure 7:
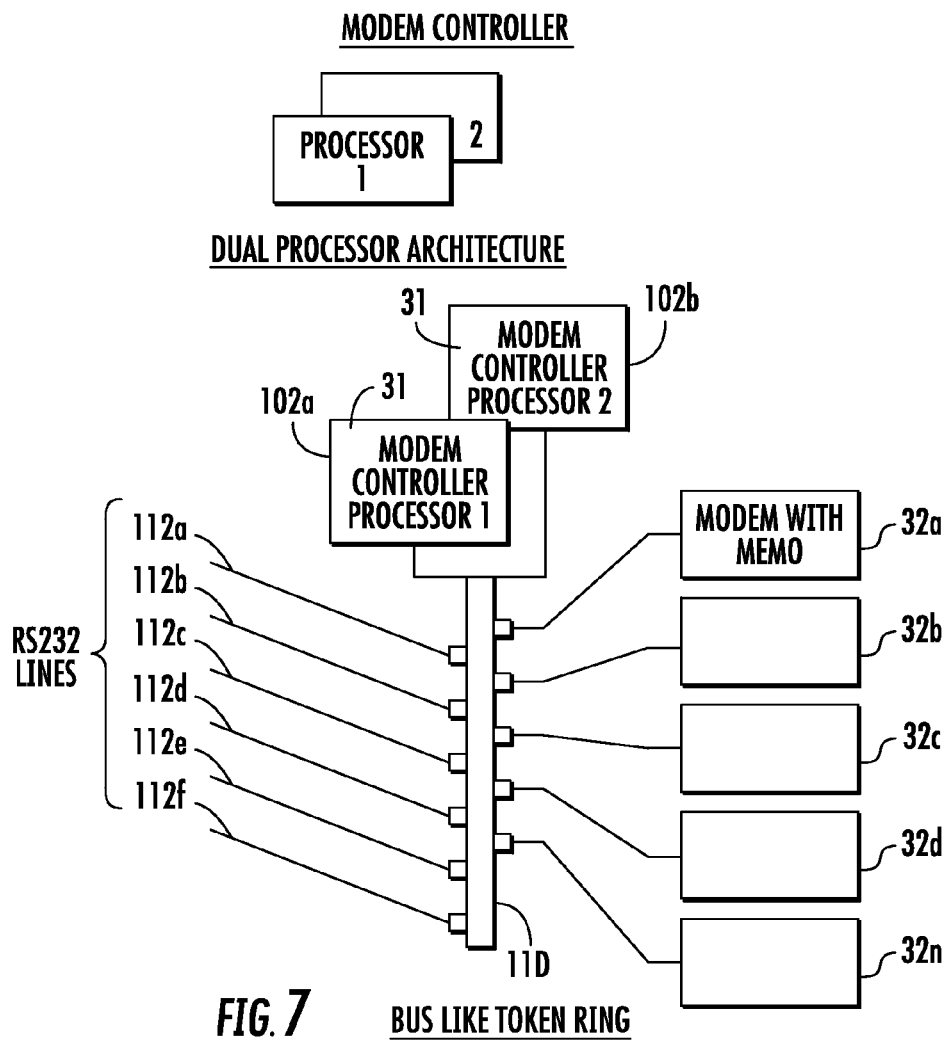
FIG. 7 is a schematic diagram of an implementation of modem controller in a dual processor architecture.

FIG. 7 is a schematic diagram of an implementation of modem controller 31 in a dual processor architecture. Modem controller 31 is implemented with processors 102a and 102b. Modems 32a-32n connect using bus 111 to RS232 lines 112a-112n. Bus 111 is controlled by modem controller 31. In the embodiment described above, for example, if it is required to control the fundamental frequency at one cycle per 30 seconds, the scan rate can be set at one scan in 7.5 seconds. The feedback can be calculated for the rate of 7.5 seconds and 15 seconds. Both are included in the transmitted message. On detecting an error, the 15 second calculation from the previous period is substituted by the system for the missing data due to error. This procedure keeps the application fundamental frequency without error, but lower level harmonics are affected. The process needs to be managed only at the fundamental frequency.

During a data scan period, the amount of time used for communications is very small. This feature can be used to multiplex several data points on one modem. A data scan period is the time used for communication for receipt at the control center, calculating the response and sending the response back.

The following table 1 shows the relationship with number of servicing modems in the pool and performance.

TABLE 1

| # of servicing modems | # of simultaneous requests | Average one way delay |
| --- | --- | --- |
| 3 | 6 | 240 ms |
| 3 | 9 | 280-360 ms |
| 5 | 10 | 240 ms |
| 5 | 15 | 280-320 ms |

Additionally, there will be a network delay of around 100 ms. In the case of three modems servicing six simultaneous requests, the total delay is 340 ms. In the case of five modems servicing 15 requests, the total delay is 380-420 ms.

The total delay will have the delay from the sampling and transmission from the process, time for control algorithm calculations and return of the calculated setting to the controller. If the calculations take approximately one second, then the total round trip delay is around 1.8 seconds.

If the start times can be staggered initially at set up time for the control loop by a small amount like one second, then even in the worst case, up to three seconds can be used for communication, one second prior, current and one second later. This allows the FIFO/LIFO capacity to be increased by three. Therefore, in the case of five modems, the total capacity is 30 data scans simultaneously for a loading of only 2 simultaneous messages per modem. A loading of 30 data scans on a pool of five modems is suggested for highly reliable operation.

In an example, N+2 architecture there are seven modems 32, three modem controllers 31 and three power supplies three interconnecting buses 111. Each controller 31 has its own memory, which can be accessed through three parallel memory buses 111. One modem and one controller can be simultaneously used for optimization studies. At N+1 condition, the optimization controller can be kept as stand by. Each supervisor and control center operator is given specific set of access privileges. According to the privilege, access to different messages are controlled.

Figures 8, 9:
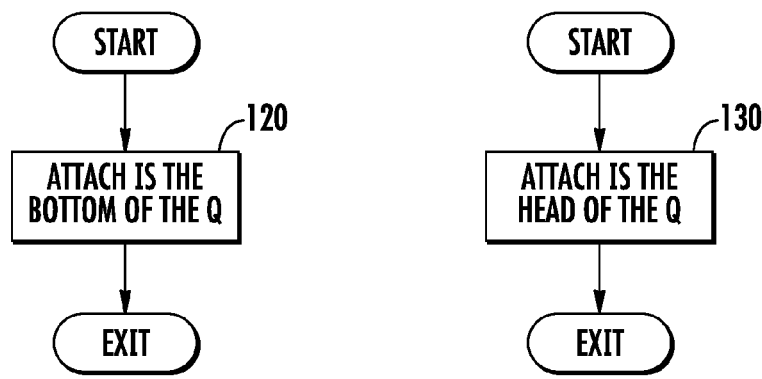
FIG. 8 is a schematic diagram for FIFO transmit and receive.
FIG. 9 is a schematic diagram for LIFO transmit and receive.

FIG. 8 is a schematic diagram for FIFO transmit and receive. In module 120, data is attached to the bottom of the queue at one of modems 32 and is removed according to a FIFO queuing.

FIG. 9 is a schematic diagram for LIFO transmit and receive. In module 130, data is attached to the top of the queue and is removed according to LIFO queuing.

Figure 10:
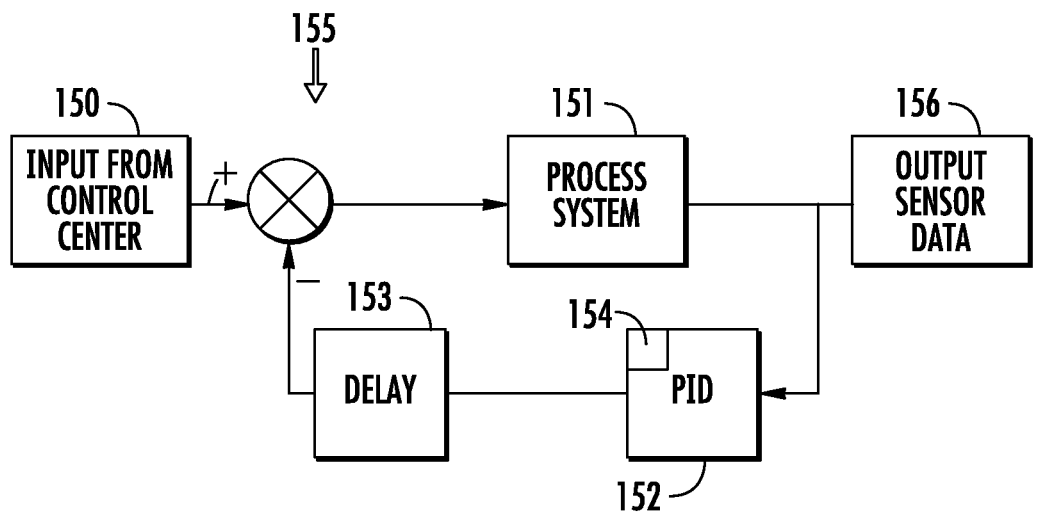
FIG. 10 is a schematic diagram of a system for error control and automatic error recovery including delay in a feed back loop.

FIG. 10 illustrates a system for error control and automatic error recovery including delay in a feed back loop. Input 150 from control center 28 is used to remotely monitor process 151. For example, process 151 can be equipment or a process on an offshore drilling platform, such as a process vessel. For example, input 150 can be used to control valve 157. Control valve 157 coupled to process 151 is controlled by Proportional, Integral and Derivative (PID) controller 152. A small reliable delay 153 introduces a phase lag in the fundamental frequency of the process under control. A phase lag can be controlled with phase lead module 154. A phase lead can be incorporated into the derivative function of Proportional, Integral and Derivative (PID) controller 152. The average delay of the two way phase lead module 154 communication determines the phase lag, not the lag that occurs at each communication. Process 151 is controlled with feedback loop 155 that contains a reliable small delay, which is equivalent to introducing a phase lag in the fundamental frequencies at which the variables like level, temperature and concentration are controlled. The phase lag can be controlled through phase gain in the PID controller 152. Output 156 includes sensor data from process 151. For example, output 156 can be directed to a level of fluid in a vessel of process 151, a concentration of a fluid material in a vessel of process 151, a temperature measurement of process 151 or a pressure measurement of process 151. Output 156 is sent to control center 28.

The phase lag can be determined and a scanning rate can be determined which is at Proportional, Integral and Derivative (PID) controller 152 which is less than the phase lag. For example, if the fundamental frequency for the control of the variables in the process has a period of 30 seconds, the scanning rate for the variables can be at a rate of about 1 in 15 seconds or less, which is twice the rate of the fundamental frequency. If a delay of two seconds is introduced in the feed back loop, the phase lag is approximately 20 to 30 degrees ($2/30$)×360) caused by the delay. Therefore, a phase gain of 20 to 30 degrees can be introduced into the feedback loop. The error control method involves over scanning and keeping sufficient information in each transmission for error control. Over scanning at twice the required rate enables the system to provide accurate response even if one scan period is missed. At each information transmission, there should be data necessary for the scan period and two times the scan period.

Referring to FIG. 1, operation interface 35*a* can be an HTML interface or graphic interface to view the status of any of control operations going on. Operation interface 35 is substantially real time with the access provided with time constraints of the control messages. The time constraints described above are for control messages only.

Types of messages used in system 20 regarding the remote application process 25 under control include: control messages; command messages; supervisory messages; and administrative messages. Control messages include two way messages from modems 32*a*-32*n* to remote application process 25 and two way messages from modems 32*a*-32*n* to control center process 28. Command messages include two way messages from: modem controllers 31*a*-31*n* of modem bank 27*a* to modem controllers 31*a*-31*n* of modem bank 27*b*, from master modem controller 30 at remote site 21 to master modem controller at control center 24, master modem controller 30 to modem controllers 31*a*-31*n*, simulation interface 35*b* to administration server 34, and administration server 34 to master modem controller 30. Supervisory messages include one way messages from modems 32*a*-32*n* to modem controller 31*a*-31*n*, modem controller 31*a*-31*n* to master modem controller 30, and email server interface 35*c* to email devices 160. Supervisory messages between email device 160 and administration server 34. Administrative messages include one way messages between: modem 32*a*-32*n* and modem controller 31*a*-31*n*; modem controller 31*a*-31*n* and master modem controller 30; and email interface 35*c* and service provider 35*d*. Administrative messages include two way messages between email interface 35*c* and service provider 35*d*.

Figure 11:
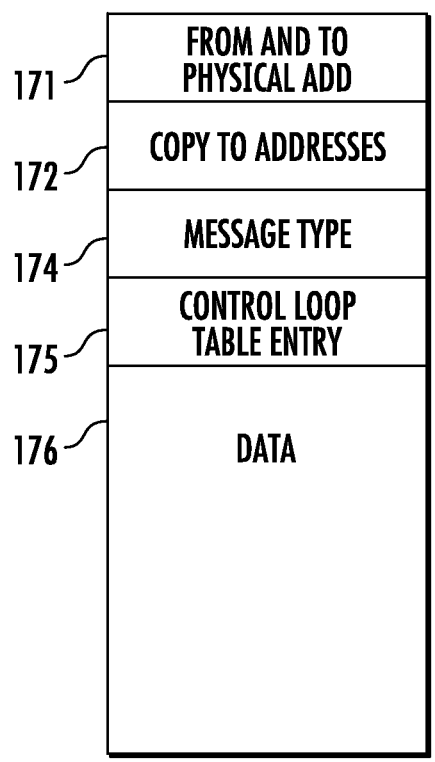
FIG. 11 is a schematic diagram of data structure for messages used in the system shown in FIG. 1.

FIG. 11 is a schematic diagram of data structure for messages used in system 20. Messages 170 include physical address 171, copy to address 172, message type 174, control loop table entry 175 and data 176.

Referring to FIG. 1, during operation, system 20 can be used to allow control system operators at control center 21 to send data to remote process applications 25, for example, the data can be used to change connections in control system loops controlled by remote process applications 25. Alternatively, simulation interface 35*b* can be used to send data to remote process applications 25, for example, the data can be used to change connections in control system loops controlled by remote process applications 25. Email interface 35*c*, operation interface 35*a* or simulation interface 35*d* can forward control requests to administration server 34. Administration server 34 checks access and security requirements and after verification sends a request to master modem controller 30 at control center 24. Master modem controller 30 disables the control system loop preventing any new data transfers from process system 151. Master modem controller 30 updates a master loop control table and sends command request to relevant modem controllers 31*a*-31*n* and remote application processes 25. After modem controllers 31*a*-31*n* and remote application processes update respective loop control tables and provide confirmation to master modem controller 30 that the updating is complete, master modem controller 30 puts the control system loop online. Email addresses of the control system operator and supervisory personnel can be added to the messages of the control system loop. The request is sent to email interface 35*c* for verification. After verification of the validity of the addresses, email interface 35*c* sends a message to master modem controller 30. Master modem controller 30 updates all modem controllers 31*a*-31*n* and remote application processes using command messages. On detecting a degraded channel, administrative messages are sent to service provider interface 35*d* to reduce the noise level on one or more specific channels. Operators using system 20 and service provides are only notified if the problem persists.

Figure 12:
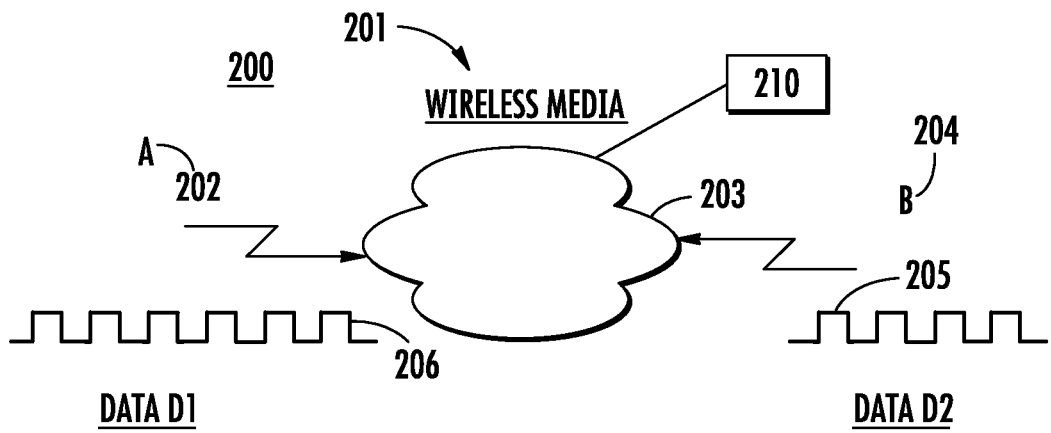
FIG. 12 is a schematic diagram of control system for a time series data transmission.
Figure 13:
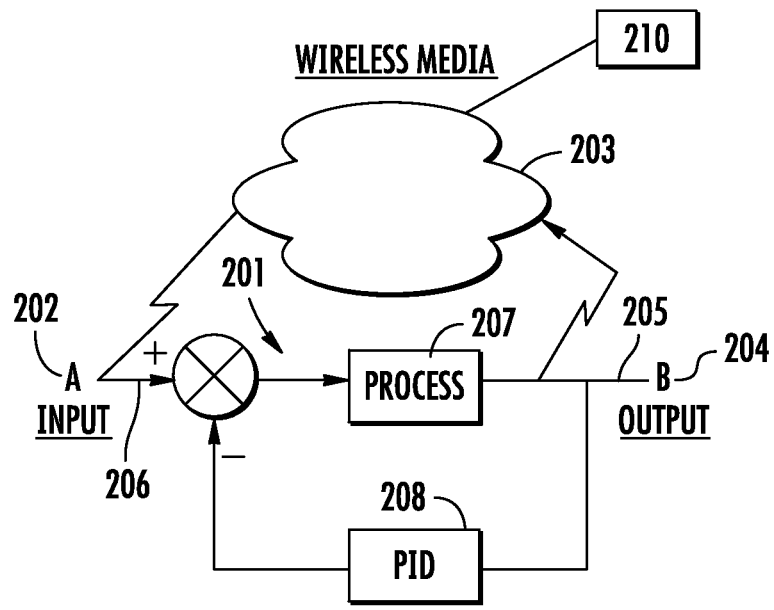
FIG. 13 is a schematic diagram of wireless control of one process control loop.

FIG. 12 is a schematic diagram of control system for a time series data transmission 200. In this embodiment, process control loop 201 exists between entity 202 wireless communications 203 and entity 204. Process control loop 201 is closed each time at the receipt of data 205 from entity 204. Upon closing of loop 201, entity 202 responds by sending data 206 to process 207, as shown in FIG. 13. A wired connection between entity 202, PID 208 and entity 204 can alternatively be used to close control loop 201. Master controller 210 receives data from control loop 201. Upon receiving a value from control loop 201, master controller 210 notes the initial value of the closed loop that has been sent and the time at which the loop was closed. If the loop is not closed, master controller 201 can immediately detect it.

Figure 14:
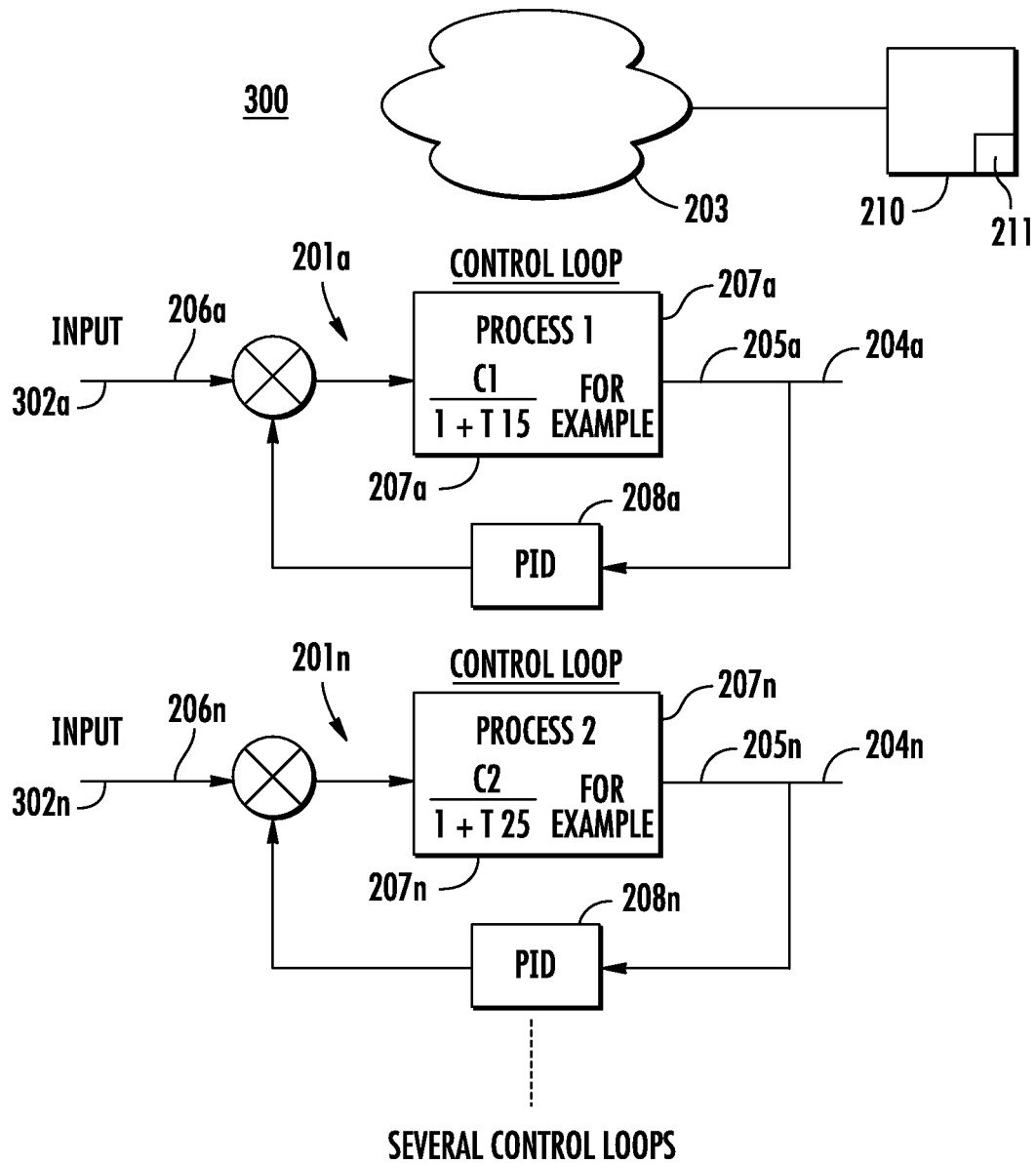
FIG. 14 is a schematic diagram of a multi-variable control system using remote control with multiple control loops.

FIG. 14 is a schematic diagram of process control system 300 with a plurality of control loops 301*a*-301*n*. The complex process control system can be described mathematically with a linear differential equation as following:

$$\frac{dY}{dt} = A \cdot X(t) + B \cdot Y(t) + C(t).$$

where Y is the vector of output state variable, x is the vector of system state variables and C is the vector of control actions. B and A are matrices.

Control loops 301*a*-301*n* are connected through wireless communications 303 to master controller 310. Master controller 310 monitors the closing of each of control loops 301*a*-301*n* and stores information for the status of the control loops in control table 311 at a master controller 310. Master controller 310 receives data from all control loops. The data being transmitted at each of control loops 301*a*-301*n* can be a time series with a fixed interval between the transmissions based on a scanning frequency. Upon receiving a value from control loop 301a-301n, master controller 310 notes the initial value of the closed loop that has been sent and the time at which the loop was closed. If one of control loops 301a-301n is not closed, master controller 310 can immediately detect it. In one embodiment, a different one of control loops 301a-301n can be substituted for control loop 301a-301n that was not closed. The start times of the time series for each of loops 301a-301n can be staggered to allow data from each of loops 301a-301n to arrive at master controller 310 without conflict with other time series. Master controller 310 is aware of all time series from loops 301a-301n it is managing and if the start time of the time series is kept adequately away from the other time series data at the start, the data for transmission will continue to arrive at master controller without conflict from other time series.

Figure 15:
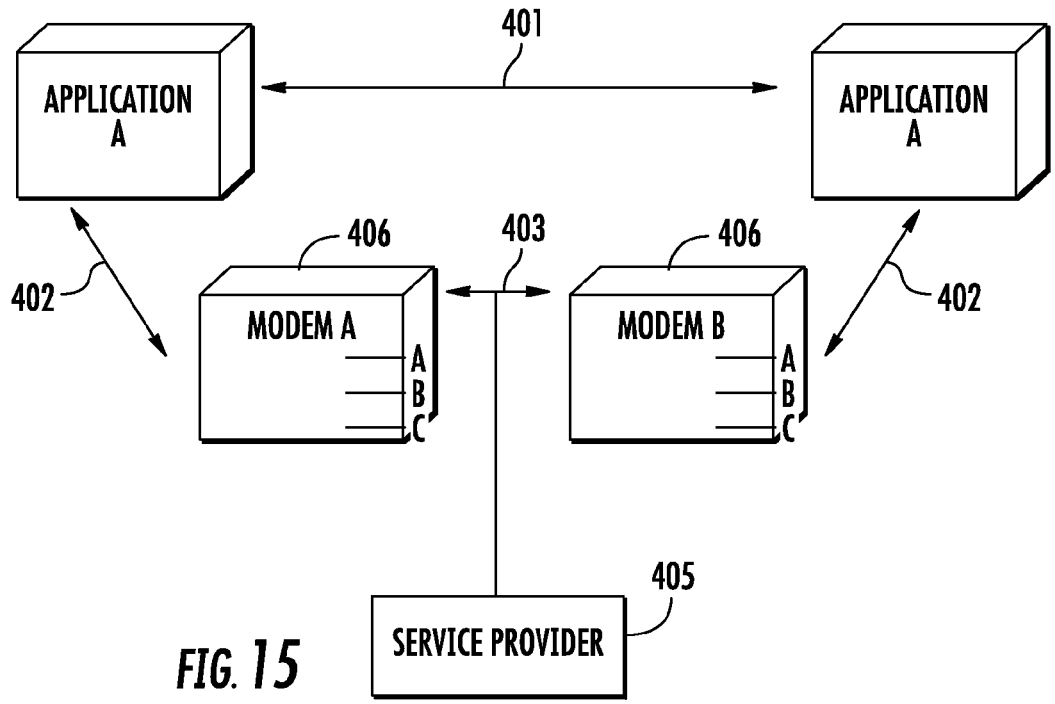
FIG. 15 is a schematic diagram of a protocol and signaling scheme.

Signaling messages and data transmission messages can be communicated using system 20, system 200 and system 300. The signaling messages can be formally segmented in multi-layer protocols into (i) application level protocols 401 which communicate only with its peer application level, (ii) application to modem protocols 402, which communicate only with the application and modem at the same location and (iii) modem to modem protocols 403, as shown in FIG. 15. With this layered approach, each of these layers can be changed as technology changes. Service provider 405 can provide communication between modems 406.

The number of signaling messages is preferred to be small to simplify signaling. For example, less than 10 signaling messages can be used in the present invention. Each message can be assigned a number from 1 to 10. When a type of message is to be sent, the number of Binary Coded Digits (BCD) is repeated to fill the message. The size of the message is limited to the size of the smallest block for transmission. For example, in Cellular Digital Packet Data (CDPD), the smallest block is 120 bits. This represent a message comprising of the number in BCD repeated 30 times with 1 digit represented by 4 bits. A single bit error or multiple single bit error can corrupt one or more of the digits. A predetermined threshold, such as 80% can be set, such that if the message that is received has 80% of the digits in an acceptable pattern, then the message is not needed to be retransmitted.

Figure 16:
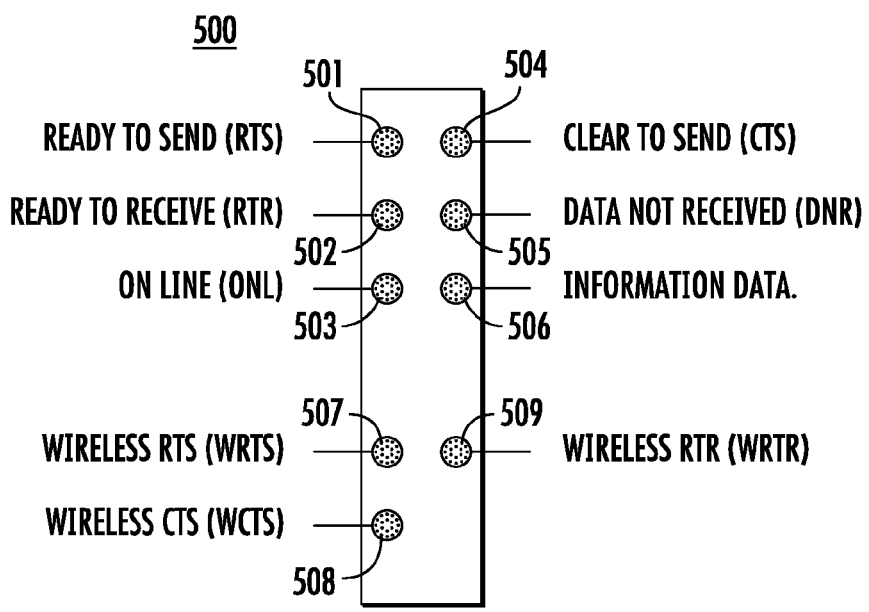
FIG. 16 is a schematic diagram of a connector pin configuration providing signaling pins for sending and receiving applications.

FIG. 16 is a schematic diagram of connector 500 in accordance with the teachings of the present invention. Connector 500 can be used as an RS232 connector to implement data transmission in accordance with the present invention. Connector 500 includes ready to send (RTS) pin 501, ready to receive (RTR) pin 502, on line (ONL) pin 503, clear to send (CTS) pin 504, data not received (DNR) pin 505, information data pin 506, wireless RTS (WRTS) pin 507, wireless CTS (WCTS) pin 508 and wireless RTR (WRTR) pin 509.

Figure 17:
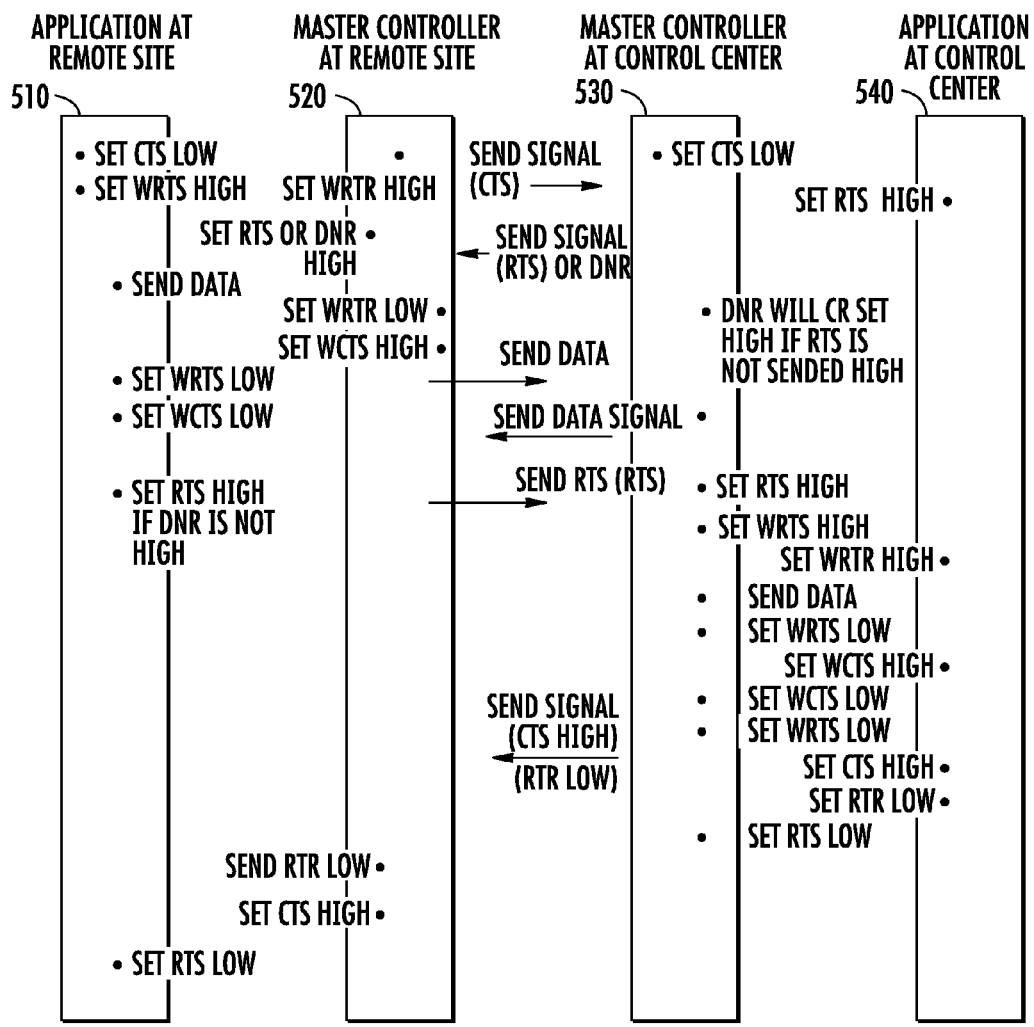
FIG. 17 is a schematic diagram of functions for applications at a remote site and control center and master controller at a remote site and control center.

FIG. 17 is a schematic diagram of functions for application at a remote site 510, application of master controller at remote site 520, application of master controller at control center 530 and application at control center 540. Application at remote site 510 includes the functions in the sending application for managing transfer of setting CTS low, setting RTS high, setting WRTS high and sending data to master controller at remote site 520 using WRTS pin 507, WRTR pin 509 and WCTS pin 208 for signaling. Application at remote site 510 senses for RTR high. On sensing RTR high, application at remote site 510 sets RTS high. Application at remote site 510 senses for CTS high and RTR low. On sensing RTR low and CTS high, application at remote site 510 sets RTS low and informs applications that message transmission is complete. Application at control center 540 includes the functions in the receiving application for managing transfer of sensing for CTS low. On sensing CTS low, application at control center 540 sets RTR high. Application at control center 540 senses for RTS high. On sensing RTS high, application at control center 540 receives data for wired communications using WRTS pin 507, WRTR pin 509 and WCTS pin 508 for signaling. Application at control center 540 sets CTS high and RTR low and informs applications that message transfer is complete.

Diagnostics and error control are performed by the network. If DNR is set in any line connector 500, than receiving application is in error, it is outside the network. If CTS is not set low in the prescribed timeframe, the sending application is in error, it is outside the network. If a retransmission request comes due to data not matching from the modem that were used for the transmission are set off line and one more data transfer is attempted. The modems are diagnosed for error. If the data transfer is in error again, then the network has degraded and the channel is switched and data transfer is attempted. The service provider is informed. Signaling transmission are set to tolerate gain amount of error such as about 10% bit error or about 2% error. Alternatively, the signaling transmission can be error free. If bit errors occur above 2%, but below 10%, it is an indication that the network is degrading. If this occurs more than once in a short time, for example five minutes, the service provider can be notified for corrective action.

It is to be understood that the above-described embodiments are illustrative of only a few of the many possible specific embodiments, which can represent applications of the principles of the invention. Numerous and varied other arrangements can be readily devised in accordance with these principles by those skilled in the art without departing from the spirit and scope of the invention.

What is claimed is:

1. A method for providing remote monitoring and control of remote processes comprising:
   (a) establishing communications between a remote site and a control center by using a hardwired one to one connection protocol and a wireless communications medium;
   (b) sending data from a plurality of the remote processes residing at said remote site to said control center using said wireless communications medium;
   (c) storing said received data at said control center as a synchronized time series at said control center with up to date data at the remote site;
   (d) monitoring said stored data at said control center as a synchronized time series at the remote site
   (e) receiving input at said remote site from said control center over said wireless communications medium for establishing a plurality of control loops; and
   (f) maintaining the reliability of said wireless communications medium at a high reliability level of the hardwired one to one connection protocol, wherein the high reliability level is less than about 1 error in substantially 1 million to 5 million message transmissions, wherein when said data is a RS232 signaling message a threshold error rate for retransmission of said signaling message is set to a predetermined value of a number of errors that can be accepted in said RS232 signaling message before a retransmissions of said RS232 signaling message.

2. The method of claim 1 wherein said data is time series data of the remote processes, the remote processes being an industrial process.

3. The method of claim 1 wherein a start point of said time series data is staggered with the start point of other time series data from the plurality of remote processes.

4. The method of claim 1 wherein said step of (b) includes a plurality of modem controllers at said remote site being controlled by a master modem controller.

5. The method of claim 1 wherein step (b) at said control center includes a plurality of modem controllers controlled by a master modem controller for maintaining the integrity of the wireless communication medium without any of the time series interfering with another one of the time series.

6. The method of claim 4 wherein said modem controllers include a buffer for storing said data and said data is stored and removed from said buffer with a FIFO scheme.

7. The method of claim 4 wherein said modem controllers include a buffer for storing said data and said data is stored and removed from said buffer with a LIFO scheme.

8. The method of claim 3 wherein before step (a) a channel of said wireless communication medium is set to operate at a predetermined average bit error rate.

9. The method of claim 8 wherein the average bit error rate is set below a threshold of forward error correction used in the channel of the wireless communication medium in order to increase the cumulative probability of accurate transmission to increase asymptotically to 100%.

10. The method of claim 9 further comprising the step of determining if the average bit error rate exceeds the threshold making it not possible to accurately receive data having the high reliability level on the channel and further comprising the step of:
switching to another channel of said wireless communications medium said channel is operating as previously set to the predetermined average bit error rate and repeating steps (b) through (f).

11. The method of claim 10 wherein there are at least three of said channels.

12. The method of claim 1 wherein said remote site and said control center communicate with layered protocols with separate layers for the wired communication protocol with an application layer and a lower layer conducting the entire wireless communications.

13. The method of claim 1 further comprising the step of:
using phase lead mechanisms in said process control loops for compensating for time delay caused by said wireless communication medium.

14. The method of claim 1 wherein said control center can monitor and change connection points of said remote site to different control loops at said remote site.

15. The method of claim 14 wherein said changes of said process control loops are determined by real-time simulation using data from the remote site.

16. The method of claim 14 wherein said control center includes an email interface and monitoring and changes to the process control loops can be managed from remote applications through said e-mail interface.

17. The method of claim 1 wherein the threshold is set to about 80 percent for receiving accurate binary coded digits (BCD) for providing the high reliability level.

18. The method of claim 15 wherein the wireless communication medium can be changed without changes to the remote processes at said remote site and said control center.

19. The method of claim 12 wherein there is an Application Layer which only deals with signaling between applications at the remote site and the control center, whereby data transfer from the remote site and the control center is synchronized within the time series.

20. The method of claim 13 wherein applications at the remote site and the control center achieve communications for the control loops eliminating inaccuracies resulting from time delays in communications.

21. The method of claim 1 further comprising the step of:
(g) verifying said data is accurate when said data is an information message by storing said data of said information message at said remote site in a sending buffer before step (b) of sending said data to said control center and receiving at said remote site said data of said information message from said control center and comparing said stored data at said remote site to said received data from said control center for errors, if no errors are present sending said data stored in said sending buffer to said control center or if errors are present retransmitting said data in said sending buffer to said control center and repeating steps (b)-(f).

22. A system for providing remote monitoring and control of remote processes comprising:
means for establishing communications between a remote site and a control center by using a hardwired one to one connection protocol and a wireless communications medium;
a plurality of the remote processes residing at said remote site and means for sending data from said processes to said control center over said wireless communications medium;
means for storing said received data at said control center as a synchronized time series at said control center with up to date data at the remote site;
means for monitoring said stored data at said control center as a synchronized time series at the remote site, and;
means for receiving input at said remote site from said control center over said wireless communications medium for establishing a plurality of control loops;
wherein the reliability of said wireless communications medium is maintained at a high reliability level of the hardwired connection protocol, wherein the high reliability level is less than about 1 error in substantially 1 million to 5 million message transmissions, wherein said data is a RS232 signaling message and a threshold error rate for retransmission of said signaling message is set to a predetermined value of a number of errors that can be accepted in said RS232 signaling message before a retransmissions of said RS232 signaling message.

23. The system of claim 22 wherein said data is time series data of the remote processes, the remote processes being an industrial process.

24. The system of claim 22 wherein a start point of said time series data is staggered with the start point of other time series data from the plurality of remote processes.

25. The system of claim 22 wherein said means for sending data from said processes includes a plurality of modem controllers controlled by a first master modem controller for establishing a connection between one of said first modem controllers and said wireless communication and said control center includes a plurality of second controllers controlled by a second master modem controller.

26. The system of claim 25 wherein said modem controllers include a buffer for storing said data and said data is stored and removed from said buffer with a FIFO scheme.

27. The system of claim 25 wherein said modem controllers include a buffer for storing said data and said data is stored and removed from said buffer with a LIFO scheme.

28. The system of 25 further comprising:
means for correcting an average bit error rate if the average bit error rate exceeds a threshold using either said first modem controller or said second modem controller by switching to another channel of said wireless communications medium wherein said another said channel is operating at the previously set predetermined average bit error rate.

29. The system of claim 25 wherein there are at least three of said channels.

30. The system of claim 22 wherein said control center includes an email interface and said means for monitoring and changes to the process control loops can be managed from remote applications through said e-mail interface.

31. The method of claim 22 further comprising the step of: means for verifying said data is accurate when said data is an information message by storing said data of said information message at said remote site in a sending buffer before sending said data to said control center and receiving at said remote site said data of said information message from said control center and comparing said stored data at said remote site to said received data from said control center for errors, if no errors are present sending said data stored in said sending buffer to said control center or if errors are present retransmitting said data in said sending buffer to said control center.

\* \* \* \* \*